Patented May 1, 1945

2,374,949

UNITED STATES PATENT OFFICE 2,374,949

ALKYLIDENE BIS-SALICYLIC ACIDS AND METHOD OF PREPARING SAME

Joseph B. Niederl, Brooklyn, N. Y.

No Drawing. Original application March 13, 1940, Serial No. 323,789. Divided and this application March 22, 1941, Serial No. 384,674

8 Claims. (Cl. 260—473)

This application is a division of applicant's co-pending application Serial No. 323,789, filed March 13, 1940, now United States Letters Patent No. 2,342,294.

The present invention relates to double salicyclic acid type compounds. More particularly it relates to the alkylidene bis-salicyclic type compounds.

Although methylene bis-salicyclic acid has been known and suggested for use as an intermediate in prior art production of pharmaceuticals, no alkylidene bis-salicylic acid type compounds in which the alkylidene radical contains 2 or more carbon atoms have been produced commercially heretofore. For this reason the pharmaceutical compounds, which depend upon the length of the carbon atom chain of the alkylidene group for their peculiar properties, were not obtainable. This in all probability has been due to the fact that the processes in accordance with which the methylene bis-salicylic acid was previously prepared did not lend themselves to the production of the bis-salicylic acids having an alkylidene radical of more than 1 carbon atom.

In accordance with the processes hereindescribed the heretofore unobtainable bis-salicylic acids having alkylidene radicals of more than 1 carbon atom can be produced commercially.

In accordance with one embodiment of this process, an alcoholic solution of a bis-phenol is reacted with a sodium alcoholate to form the di-sodium salt. Upon completion of the reaction, an inert absorbent is added, the solvent is driven off and the substantially anhydrous salts left as a finely dispersed deposit on the inert absorbent, asbestos or glass wool. The finely dispersed salt is next reacted with carbon dioxide at a temperature of 180° C. and at atmospheric pressure until carboxylation of the bis-phenol has taken place. The reaction product is then cooled, isolated and purified in accordance with conventional procedure.

Basically considered, this process involves the introduction of carboxyl groups into phenolic benzene rings of bis-phenols. In some respects the process resembles a process of the prior art known as the Kolbe synthesis, wherein salicylic acid is prepared by treating the sodium salt of phenol with carbon dioxide at superatmospheric pressures at a temperature of about 130° C. Although the present process also involves reaction of carbon dioxide with the salts of phenolic compounds, the prior art reaction conditions appear to be unsatisfactory for the production of the bis-salicylic acid type compounds of this invention.

In contrast with the prior art reaction conditions for introducing the carboxyl group into a phenolic benzene ring, as exemplified by the Kolbe synthesis, it was found that compounds of the double salicylic acid type can be prepared in good yields from bis-phenols at atmospheric or subatphospheric pressures by carboxylating substantially dry alkali metal salts of compounds of the bis-phenol type by reacting them with carbon dioxide at a temperature of about 180° C. Temperatures as low as 140° C. were found to give operable results. Higher temperatures can also be used provided they are not sufficiently high to decompose the salts or the reaction products.

Particularly high yields of the compounds of this invention can be obtained under these reaction conditions when provision is made for the extension of the surface area of the salt exposed to the carbon dioxide gas during the reaction period. This extension may be accomplished by any of the well known methods, including agitation, but is most effectively extended by incorporating a quantity of an absorbent or adsorbent material in the reaction vessel and finely dispersing the salt therein or thereon, and I therefore preferably make use of materials such as glass wool and asbestos in the reaction vessel.

The bis-phenols employed as starting materials in the process include alkylidene di-phenols and/or aryl-alkylidene-di-phenols of the following general structural formula:

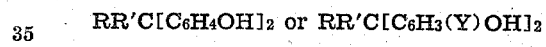

RR'C[C₆H₄OH]₂ or RR'C[C₆H₃(Y)OH]₂ in which R represents an aliphatic or aromatic radical, R' represents hydrogen or an aliphatic or aromatic radical, and wherein Y represents an alkyl or alkoxy group in ortho position to the phenolic-hydroxyl group.

These bis-phenols may be prepared by condensing mono ketones with two mols of the phenol or its ortho alkylated homologues. A condensation process of this general type is described in an article written by the inventor and his coworkers, appearing in the Journal of the American Chemical Society, volume 61, pages 345, et seq., 1939, volume 62, pages 320, et seq., 1940, and volume 62, pages 322, et seq., 1940.

The bis-phenol type compound which is to be carboxylated is first converted into its alkali metal salt, and this is accomplished by any of the procedures already known to the art. The bis-phenols, for example, may be dissolved in an alcohol solvent and then reacted with an alkali metal to form bis-phenol alcoholate. This method is particularly suitable for manufacturing the products in accordance with a preferred process in which an adsorbent or absorbent material is made use of during the carboxylation in order that the salts formed and left as a residue within the reaction chamber are finely distributed over the large surface area presented by the absorbent material, and therefore admirably positioned for making intimate contact with the molecules of carbon dioxide subsequently introduced into the chamber.

The carboxylation of the bis-phenol salts may be carried out in the same reaction chamber, but before this step is commenced the salts are made substantially anhydrous by driving off the alcohol present with the aid of heat. Carbon dioxide gas is brought into intimate contact with the finely distributed salt at atmospheric or subatmospheric pressures, at a temperature preferably maintained at 180° C. The reaction may be carried out at higher temperatures provided the salt or the reaction products formed do not decompose.

In accordance with another modification of the process for preparing the products of the invention, the carbon dioxide used is preliminarily and carefully dried and purified to remove deleterious substances ordinarily present in such gas when the same is produced by conventional methods. If, however, a source of relatively pure gas is available no additional treatment is required.

The reaction product resulting from the carboxylation can be isolated and purified in any of the well known ways. For example, it may be taken up with water, filtered, then acidified with a mineral acid, filtered again and dried. Any mono-salicylic acid or unreacted starting material may be leached therefrom with a suitable solvent.

Double salicylic acid type compounds prepared in accordance with the process herein outlined can readily be reacted to obtain metal salts which are admirable intermediates for the production of pharmaceuticals. These salts can readily be obtained by dissolving the bis-salicylic acid in a suitable solvent such as alcohol and treating the solution with a metal hydroxide. The resulting reaction product, upon being isolated and purified, is either the mono- or di-metallic salt of the bis-salicylic acid type compound, depending upon the proportion of reactants used.

The bis-salicylic acid type compounds readily react with organic acids of the aliphatic or aromatic series to form esters which are suitable for commercial use. The di-acetate of bis-salicylic acid may be formed by refluxing the bis-salicylic acid with acetic acid anhydride for a period of six hours. Other fatty acid derivatives, including those of lower and higher molecular weight and those of saturated and unsaturated character, can be made to react with the bis-salicylic acids to form mono- or di-esters.

Innumerable salicylic acid type compounds can be prepared in accordance with the instant invention, as the specific nature of the final product is determined both by reaction conditions and the nature of the intermediate used as a starting material. For example, under the proper reaction conditions it is possible to obtain single as well as double salicylic acid type compounds, while variations in the type of bis-phenol used will produce corresponding variations in the salicylic acid compound produced.

By formula, the double salicylic acid type compounds of the invention may be collectively referred to as bis-salicylic acid type compounds of the general structural formula:

$$RR'C[C_6H_2(COOX)(Y)OZ]_2$$

wherein R represents an aliphatic or aromatic radical, R' represents hydrogen or an aliphatic or aromatic radical, X represents hydrogen, a metal atom or an alkyl group, Y represents a hydrogen atom or an alkyl or alkoxy radical, and Z represents hydrogen or an acyl radical which may be of an aliphatic or aromatic nature.

The structure of the bis-phenol selected as a starting material is determinative of the structure of the RR'C radical of the final product. As has been indicated by formulae in the introductory portion of the specification, a very broad class is included thereunder. This radical may be a straight or branched chain alkylidene, such as butyl or isobutylidene, an aryl alkylidene, such as phenyl-ethyl-, or (methyl-phenyl)-butylidene radical.

The structure of the radical designated by the letter Y in the general formula is also determined by the structure of the particular bis-phenol used as the raw material. As has been indicated above, this letter may designate a hydrogen atom or an alkyl or an alkoxy group. These latter groups may be of a lower or higher molecular nature, either straight chained or branched. Several examples of alkyl and alkoxy bis-phenols (methyl and methoxy) are disclosed in the hereinbeforementioned articles appearing in the Journal of the American Chemical Society.

The salts and the esters of the compounds of the double salicyclic acid type which are produced in accordance with the process outlined above are also included within the scope of the products of the present invention. From consideration of the formula, it will be noticed that the letters X and Z may be varied to an extent which covers acids and salts as well as esters. In those embodiments of the formula in which both the X and the Z designate hydrogen, the product is an acid. If either letter does not designate hydrogen, the formula is either the salt or the ester.

Alkali metal salts of the double salicyclic acid type compounds are typical examples of the broad class of salts covered by the general formula. Other salts included are those in which X designates radicals of organic bases or such metals as iron or zinc.

The esters of the compounds of the bis-salicylic acid type of this invention are those designated by the given general structural formula when either at least one X represents an alkyl radical or at least one Z represents an acyl radical. The alkyl or acyl radicals referred to may be of either a higher or a lower molecular nature, either saturated or unsaturated. Specific examples of alkyl radicals are those of alcohols such as ethyl, isobutyl, lauryl, palmityl, stearyl and oleyl alcohol. Specific examples of acyl radicals are those of acids such as acetic, isobutyric, caprylic, lauric, palmitic, stearic, oleic, linoleic, and ricinoleic acids. These radicals, furthermore, may be of either aryl or aralkyl nature. For example, the acyl radical may be that of benzoic, salicyclic, cinnamic, or naphthoic acid.

*Example 1—2,2-bis-(4'-hydroxy-3'-carboxylphenyl)-pentane*

Two hundred eighty parts by weight of 2,2-bis- (4'-hydroxy-phenyl)-pentane, (M. P. 150° C.), $C_{18}H_{22}O_2$, prepared by condensing 86 parts by weight of methyl-isobutyl ketone with 188 parts by weight of phenol in the presence of an acid catalyst is dissolved in 5 parts of absolute methyl or ethyl alcohol. To this solution is added a solution of equal volume of absolute methyl or ethyl alcohol containing 162 or 204 parts by weight of sodium methylate or ethylate, respectively. The two solutions are then mixed and placed within a reaction chamber provided with a gas inlet tube and a still head attached to a condenser. The gas inlet tube is connected to a drying tube filled with calcium chloride. This drying tube in turn is connected with a gas wash chamber containing a concentrated sodium carbonate solution.

About 1.5 parts by weight of asbestos previously purified by ignition are then added to the solution. After this the reaction system is evacuated and the reaction chamber heated on a steam bath. After the alcohol has distilled off, the steam bath is exchanged for an oil or metal bath and the reaction mixture is gradually heated to 180° C. As soon as this temperature is reached, the evacuation is discontinued and dry carbon dioxide is passed into the reaction mixture instead, the carbon dioxide being preliminarily passed through the sodium carbonate solution and then through the drying tube. This procedure is continued for two hours.

Next the reaction mixture is allowed to cool in an atmosphere of carbon dioxide. As soon as room temperature has been reached, the reaction mass is extracted with two successive portions of approximately 7 parts of hot water on a steam bath for twenty minutes. The hot water extracts are then combined and filtered and the filtrate allowed to cool. The filtrate is then acidified with dilute (10%) hydrochloric acid until a distinctly acid reaction to Congo is obtained. The reaction product separates either as a solid, or semi-solid mass or sometimes as an oil. It is allowed to settle and is then freed from the water either by decantation or filtration. The reaction product is then dried and finally treated with a solvent, such as boiling xylene, to remove any unreacted starting material as well as any mono-salicylic acid. The bis-salicyclic acid which is insoluble in xylene remains undissolved. It is then separated from the xylene extract by filtration or by decantation. The so obtained product may then be crystallized from ethyl alcohol.

Other alkylidene bis-salicylic acids may be prepared in a similar manner by the carboxylation of the 1,1-bis-(4'-hydroxy-phenyl)-ethane (M. P. 122° C.), the 1,1- and the 2,2-bis-(4'-hydroxy-phenyl)-propanes (M. P. 130° C. and 152° C. resp.), the 1,1- and 2,2-bis-(4'-hydroxy-phenyl)-butanes (M. P. 136° C. and 124° C. resp.), the 3,3-bis-(4'-hydroxy-phenyl)-pentane (M. P. 198° C.), the 4,4-bis-(4'-hydroxy-phenyl)-heptane (M. P. 155° C.) and the 2,2-bis-(4'-hydroxy-phenyl)-octane (M. P. 83° C.).

*Example 2—1-(4'-methyl-phenyl)-1,1-bis-(4'-hydroxy-3'-carboxyl-phenyl)-ethane*

3.04 grams of 1-(4'-methyl-phenyl)-1,1-bis-(4'-hydroxy-phenyl)-ethane, (M. P. 133° C.), $C_{21}H_{20}O_2$ prepared by condensing p-tolyl-methyl ketone with phenol in the presence of an acidic catalyst is dissolved in 5 parts of absolute methyl or ethyl alcohol. To this alcoholic solution of the bis-phenol is added an equal volume of absolute methyl or ethyl alcohol containing 1.62 or 2.04 grams of sodium methylate or ethylate, respectively. The two solutions are then mixed and placed into a round bottom reaction flask. Two grams of glass wool are then added to the alcoholic solution of the sodium salt. The flask is provided with a glass stopper possessing a standard glass ground joint fitting into the neck of the reaction flask.

The glass stopper carries a gas inlet tube and a side arm. To this side arm is connected a receiver or a condenser and a receiver. The gas inlet tube which extends almost to the bottom of the reaction flask carries a gas purifying and drying arrangement. The gas utilized passes first through a gas wash-bottle filled with concentrated sodium carbonate solution, then through a drying tube filled with a dehydrating agent such as calcium chloride. The reaction flask is placed upon a suitable heating bath, metal, sand or oil, provided with a thermometer. The glass stopper is then inserted into the reaction flask. The inlet tube is connected with the drying tube and the side arm with the receiver. The system is then evacuated allowing a fine stream of air to pass first through the sodium carbonate solution, then through the drying tube and finally into the reaction flask containing the alcoholic solution of the sodium salt of the bis-phenol mixed with the absorbent asbestos. The heating is then begun and the alcohol allowed to distill off. After the alcohol has distilled off the temperature is gradually raised to 180° C. As soon as this temperature is reached evacuation is discontinued and carbon dioxide is allowed to enter the reaction flask instead, the gas going first through the gas washing-bottle containing the sodium carbonate solution, and then through the drying tube. This process of passing dry carbon dioxide gas through the reaction mixture at 180° C. is continued for two hours.

The reaction mixture is then allowed to cool to room temperature in an atmosphere of carbon dioxide. Twenty cc. of 20% aqueous sodium hydroxide solution is then added to the reaction mixture in the flask, whereupon it is heated on a steam bath for twenty minutes. The mixture is then filtered through a fritted glass filter. The flask as well as the absorbent is washed twice with 10 cc. portions of distilled water. These washings are added to the alkaline extract. The filtered extract is acidified with dilute (10%) aqueous hydrochloric acid until distinctly acid to Congo. The acidified extract is then extracted in a separatory funnel with two successive 25 cc. portions of ether. The combined ether extract is washed with 30 cc. of distilled water and then extracted with 30 cc. of 5% sodium carbonate solution. The sodium carbonate solution is separated and then extracted with 25 cc. of ether to remove any non-carboxylated product. The sodium carbonate solution is then acidified with 10% hydrochloric acid until distinctly acid to Congo. This acidified extract is again extracted with two 30 cc. portions of ether. The resulting ether extracts are combined and washed with 30 cc. of distilled water. The combined ether extracts are then dried with anhydrous sodium sulfate, filtered, and the ether allowed to evaporate at room temperature. The residue left is then treated with hot benzene, toluene, or xylene to remove any mono-salicylic acid. The product upon being crystallized from alcohol is an aryl-alkylidene bis-salicylic acid.

The homologues of the above bis-phenol, such as the 1-phenyl-1,1-bis-(4'-hydroxy-phenyl)-ethane (M. P. 187° C.) may be carboxylated in substantially the same manner, or in the manner described in Example 1.

The above compounds are merely illustrative examples of preferred embodiments of the products of my invention.

In its broadest aspects the instant invention contemplates alkylidene, bis-salicylic acids, their salts and their esters. Likewise, it includes those bis-salicylic acid salts or esters of the above type in which the phenyl group of the salicylic acid is substituted by other radicals.

It should be understood that the invention is not limited to the specific examples set out herein, but that it extends to all equivalent materials and structural alterations which will occur to those skilled in the art upon consideration of the instant disclosure and the scope of the claims appended hereto.

I claim:

1. A bis-salicylic acid type compound of the general structural formula:

RR'C[C$_6$H$_2$(COOX)(Y)OZ]$_2$ wherein RR'C contains at least 4 carbon atoms, R represents a hydrocarbon radical of the group consisting of alkyl and aryl-alkyl radicals, R' represents a member of the group consisting of hydrogen, an alkyl radical and an aryl radical, X represents a member of the group consisting of hydrogen, a metal atom and an alkyl group, Y represents a member of the group consisting of a hydrogen atom, an alkyl radical and an alkoxy radical in ortho position in relation to the OZ radical, and Z represents a member of the group consisting of hydrogen and a carboxylic acyl radical.

2. A bis-salicylic acid of the following structural formula:

RR'C[C$_6$H$_2$(COOH)(Y)OH]$_2$ wherein RR'C contains from 4 to 11 carbon atoms, R represents a hydrocarbon radical of the group consisting of an alkyl and an aryl-alkyl radical, R' represents a member of the group consisting of hydrogen, an alkyl radical and an aryl radical, and Y represents a member of the group consisting of a hydrogen atom, an alkyl radical and an alkoxy radical in ortho position in relation to the OH radical.

3. A di-acetic acid ester of a bis-salicylic acid type compound of the following structural formula:

RR'C[C$_6$H$_2$(COOH)(Y)OOC$_2$H$_3$]$_2$ wherein RR'C contains from 4 to 11 carbon atoms, R represents a hydrocarbon radical of the group consisting of an alkyl and an aryl-alkyl radical, R' represents a member of the group consisting of hydrogen, an alkyl radical and an aryl radical, and Y represents a member of the group consisting of a hydrogen atom, an alkyl radical and an alkoxy radical in ortho position in relation to the OOC$_2$H$_3$ radical.

4. A di-sodium salt of a bis-salicylic acid type compound of the following structural formula:

RR'C[C$_6$H$_2$(COONa)(Y)OH]$_2$ wherein RR'C contains from 4 to 11 carbon atoms, R represents a hydrocarbon radical of the group consisting of an alkyl and an aryl-alkyl radical, R' represents a member of the group consisting of hydrogen, an alkyl radical and an aryl radical, and Y represents a member of the group consisting of hydrogen and an alkyl radical and an olkoxy radical in ortho position in relation to the OH radical.

5. Alkylidene bis-salicylic acids wherein the alkylidene group contains at least 4 carbon atoms.

6. 2,2-bis-(4'-hydroxy-3'-carboxy-phenyl)-4-methyl-pentane.

7. A bis-salicylic acid type compound of the general structural formula:

R[C$_6$H$_3$(COOH)OH]$_2$ wherein R is an alkylidene radical of from 4 to 8 carbon atoms.

8. A bis-salicylic acid type compound of the general structural formula:

R[C$_6$H$_2$(COOX)(Y)OZ]$_2$ wherein R is an alkylidene radical containing at least 4 carbon atoms, X represents a member of the group consisting of hydrogen, a metal atom and an alkyl group, Y represents a member of the group consisting of a hydrogen atom, an alkyl radical and an alkoxy radical in ortho position in relation to the OZ radical, and Z represents a member of the group consisting of hydrogen and a carboxylic acyl radical.

JOSEPH B. NIEDERL.